(No Model.)

E. M. WAY.
Milk Cooler.

No. 230,211. Patented July 20, 1880.

Witnesses:
F. B. Townsend
E. Blackman

Inventor:
Elijah M. Way
per L. B. Coupland & Co.,
Attorneys.

N. PETERS, PHOTO-LITHOGRAPHER, WASHINGTON, D. C.

UNITED STATES PATENT OFFICE.

ELIJAH M. WAY, OF GENESEO, ILLINOIS.

MILK-COOLER.

SPECIFICATION forming part of Letters Patent No. 230,211, dated July 20, 1880.

Application filed April 21, 1880. (No model.)

*To all whom it may concern:*

Be it known that I, ELIJAH M. WAY, of Geneseo, in the county of Henry and State of Illinois, have invented certain new and useful Improvements in Milk-Coolers; and I do hereby declare the following to be a full, clear, and exact description of the invention, that will enable others skilled in the art to which it appertains to construct and make use of the same, reference being had to the accompanying drawings, and to letters of reference marked thereon, forming a part of this specification.

This invention relates to that class of coolers having the milk-setting vessels submerged in water; and it consists of certain novel features in the construction and arrangement of the apparatus, as will be hereinafter more fully described in detail, and set forth in the claims.

Figure 1:
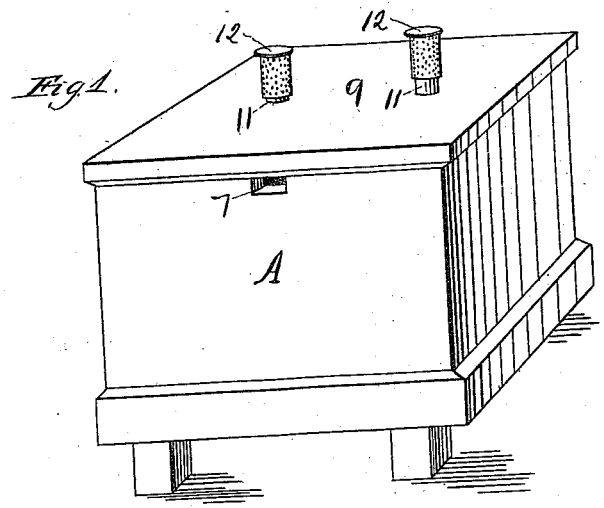
Figure 2:
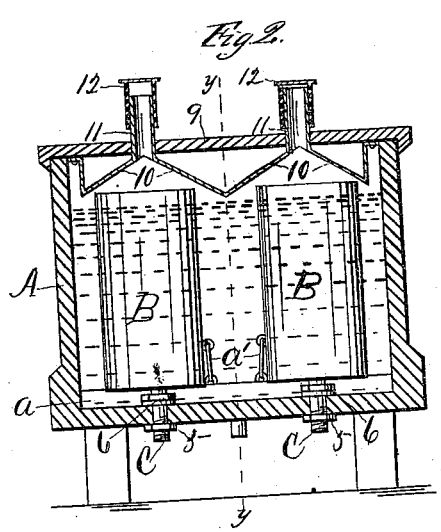
Figure 3:
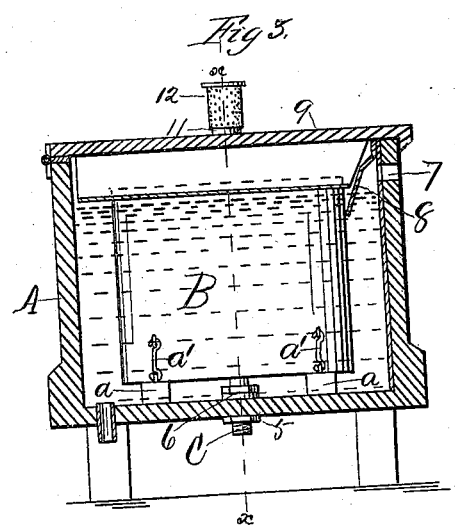

Figure 1 is a view, in perspective, of the tank inclosing the milk-setting vessels; Fig. 2, a vertical section in the plane $x\ x$, Fig. 3; Fig. 3, a vertical section in the plane $y\ y$, Fig. 2; and Fig. 4, a view looking from above, with the cover thrown back.

Figure 4:
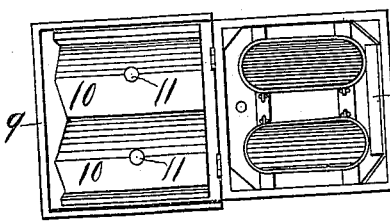

Referring to the drawings, A represents a water-holding tank, lined with sheet metal, which may be of such dimensions as will adapt the tank to receive one or more milk-holding vessels, arranged side by side and at a certain distance apart, leaving an intervening water-space, as shown in Figs. 2 and 4 of the drawings.

The cleats $a\ a$ are placed on the interior bottom of the tank A, providing a raised rest or bearings for the milk-vessels B.

The fastening devices $a'\ a'$ are for the purpose of securing the milk-vessels B in a stationary position to the cleats $a\ a$.

The milk-holding vessels B may be of any form that will present the greatest amount of cooling-surface and secure the least density of th. milk, thereby greatly assisting in rapidly reducing the temperature of the milk and quickly causing the cream to rise to the surface.

The threaded tubular extension C is attached rigidly to the milk-vessels B and extends downward through the bottom of the cooling-tank A. On the exterior end of the tube C is placed the nut 5, which screws up to a bearing on the under side of the tank A. The nut 6 is placed upon the tube C on the interior bottom of the tank A, as shown in Figs. 2 and 3 of the drawings, and has a flexible packing-washer between the bottom of the tank and the nut 6, so that when these parts are screwed down to a bearing in connection with nut 5 all leakage is prevented around the tubular extension C. Through this tube C the milk may be drawn from the vessels and the same thoroughly washed out without removing the milk-holding vessels from the cooling-tank. This outlet from the bottom of the milk-vessels B is closed by a suitable stopple, rubber being considered preferable for this purpose.

The air passage or inlet 7 is located in the cooling-tank A, at a point near the top of the same, and the air passing into the cooler at this point strikes the deflecting wing 8 and passes downward into immediate contact with the surface of the water in the cooling-tank, in this manner purifying the air and removing all dust and floating particles from the same before it reaches the milk.

By this order of arrangement the milk-cooling tank can be set out in the open air or placed where strong drafts of air prevail, as there is no possibility of any impure air or dust and dirt reaching the milk through the air-inlet 7 by the interposition of the deflecting-wing. If this wing were removed, there would be nothing to prevent the dust and dirt floating in the air from passing to the milk directly as it enters the tank. This deflecting-wing 8 is attached by the upper edge at a point just above the air-inlet to the interior of the cooling-tank, and projects inward and downward therefrom at an oblique angle, as shown in Fig. 3 of the drawings, for the purpose of exposing a large area of water-surface to the action of the atmosphere.

As herein shown, the deflecting-wing 8 is attached to but one side of the cooling-tank, and extends inward and downward to a point just below the immediate surface of the water-line, leaving spaces or air-passages between the ends of the wing and the walls of the tank; or I may have the deflecting-wing stop at a point just above the surface of the water, having the ends thereof attached to the walls of the cooling-tank, and allowing the air to pass to the milk-cans between the lower edge of the wing 8 and the surface of the water. This wing may be arranged around two or three sides of the tank. If the wing extends below the water-line, one side of the tank should be left for the circulation of the air; but if an air-space is left between the lower edge of the wing and the surface of the water, the deflecting-wing may be placed clear around the interior of the cooling-tank.

To the under side of the top or cover 9 of the cooling-tank A is attached the corrugated metal lining 10, which serves as a cover or covers for the milk-vessels B. This corrugated cover does not fit down closely onto the milk-vessels, but leaves an intervening space for ventilation and a free circulation of the atmosphere. By this arrangement the foul air and animal vapors rising from the warm milk are collected at a central point and escape through the tubes 11 to the open air. The tubes 11 are provided with the adjustable perforated caps 12, which permit the foul vapors to escape, and at the same time prevent dust or falling particles from passing into the milk-vessels.

The caps 12 have telescopic connection with the tubes 11, which permits of their being raised to the highest point for ventilating purposes, and when the milk is cool closed down tightly.

The cooling-tank A is provided with suitable inlet and outlet water-passages; but as there is nothing new or novel in this connection, they are not shown or described here.

The corrugated metal lining is attached rigidly to the wooden cover of the cooling-tank, and by its peculiar form leaves an air-space between the outside cover proper and the metal lining or cover for the milk-holding vessels, so as to guard against being injuriously affected by the action of heat or cold from the outside; and when the cover of the cooling-tank is raised the milk-vessels are uncovered at the same time.

The essential features required in a milk-cooling apparatus are a free and thorough ventilation, the admission of air which is purified and has all particles of dust removed before it reaches the milk, and the collection of the foul vapors at a central point, where they are allowed to escape from the cooling-tank.

Having thus described my invention, what I claim as new, and desire to secure by Letters Patent, is—

1. In a milk-cooling apparatus of the character hereinbefore described, the deflecting-wing 8, projecting downward from the interior of the top of the cooling-tank A, and set at an oblique angle relative to the square of the same, substantially as described.

2. In a milk-cooling apparatus, the combination, with the cooling-tank A and the milk-setting vessel or vessels B, of the deflecting-wing 8, as and for the purpose herein set forth.

3. In a milk-cooling apparatus, the combination of the following elements, consisting of the cooling-tank A, the milk-setting vessels B, the deflecting-wing 8, the cover 9, the corrugated metal lining 10, attached rigidly to the under side of the cover 9, the tube or tubes 11, and the adjustable perforated caps 12, all constructed, arranged, and operating in the manner and for the purposes set forth.

ELIJAH M. WAY.

Witnesses:
Le Roy E. Woodruff,
Alexander White.